United States Patent
Tani

(10) Patent No.: US 8,280,551 B2
(45) Date of Patent: Oct. 2, 2012

(54) MANIPULATOR WITH CAMERA

(75) Inventor: Kota Tani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 12/778,432

(22) Filed: May 12, 2010

(65) Prior Publication Data

US 2010/0298978 A1 Nov. 25, 2010

(30) Foreign Application Priority Data

May 19, 2009 (JP) ................................. 2009-121188
May 10, 2010 (JP) ................................. 2010-108546

(51) Int. Cl.
*B25J 13/08* (2006.01)

(52) U.S. Cl. ............. 700/259; 901/47; 901/31; 901/14; 901/27

(58) Field of Classification Search .................. 700/259, 700/245; 901/14–18, 28, 29, 30, 31, 46, 901/47

See application file for complete search history.

(56) References Cited

U.S. PATENT DOCUMENTS

| | | | | |
|---|---|---|---|---|
| 5,672,044 A * | 9/1997 | Lemelson | .................. | 414/744.3 |
| 6,816,755 B2 * | 11/2004 | Habibi et al. | ................. | 700/259 |
| 7,072,739 B2 * | 7/2006 | Bash et al. | ..................... | 700/245 |
| 7,171,286 B2 * | 1/2007 | Wang et al. | .................... | 700/248 |
| 8,095,237 B2 * | 1/2012 | Habibi et al. | ................. | 700/245 |
| 2004/0172164 A1 * | 9/2004 | Habibi et al. | ................. | 700/245 |
| 2004/0243280 A1 * | 12/2004 | Bash et al. | ..................... | 700/245 |
| 2009/0234502 A1 * | 9/2009 | Ueyama et al. | ............... | 700/259 |
| 2010/0158656 A1 * | 6/2010 | Seavey | ........................ | 414/744.5 |
| 2011/0301758 A1 * | 12/2011 | Nakajima et al. | ............. | 700/259 |
| 2012/0112009 A1 * | 5/2012 | Gryniewski et al. | ....... | 244/172.2 |

FOREIGN PATENT DOCUMENTS

JP 62-277290 A 12/1987
JP 63-052990 A 3/1988

* cited by examiner

*Primary Examiner* — Drew Brown
(74) *Attorney, Agent, or Firm* — Fitzpatrick, Cella, Harper & Scinto

(57) ABSTRACT

A manipulator includes at least one camera capable of observing an end effector from a direction suitable for work. A rotating portion rotatable coaxially with the end effector is provided to a link adjacent to a link located at a manipulator tip end. At least one camera for recognizing a work piece as an object is arranged on the rotating portion through a camera platform. An actuator for controlling a rotation angle of the rotating portion is driven according to a rotation angle of the link located at the manipulator tip end, and thus the camera is arranged in a direction perpendicular to a plane where the end effector can move when the end effector performs a grip work. In an assembly work, the rotating portion is rotated such that the camera is arranged in a direction parallel to the plane where the end effector can move.

5 Claims, 7 Drawing Sheets

MANIPULATOR WITH CAMERA

BACKGROUND OF THE INVENTION

1. Field of the Invention

The present invention relates to a manipulator with at least one camera, which has an function of recognizing an object with the camera.

2. Description of the Related Art

In an assembly work using an end effector attached at a tip end of a manipulator, in order to recognize an object to be assembled, and to perform work in various working regions, it is necessary to prepare a camera provided onto the manipulator. Conventionally, as illustrated in FIG. 7A, the camera mounted onto the manipulator mostly has a structure in which a position of a camera 103 is fixed relative to an end effector 101 and the camera 103 is attached at the tip end of the manipulator (see Japanese Patent Application Laid-Open No. 62-277290). However, in the above-mentioned structure, the camera observes the end effector from a fixed direction.

Further, as illustrated in FIG. 7B, as another conventional technology, there is known a structure in which a camera 203, which is rotatable about a Y-axis and a Z-axis, is fixed to a casing of a polyarticular robot so as to always keep an end effector 201 in the field of view, to thereby make the field of view of the camera variable (see Japanese Patent Application Laid-Open No. 63-52990). In the structure, the camera 203 is mounted onto a camera platform 202 rotatable about multiple axes.

However, in the structure illustrated in FIG. 7A (described in Japanese Patent Application Laid-Open No. 62-277290), the camera observes the end effector from the fixed direction, and hence the position of camera 103 is determined by the position of the end effector. That is why the feature of object is sometimes out of the field of view of the camera.

Further, as described in Japanese Patent Application Laid-Open No. 63-52990, in the structure using the camera platform rotatable about the multiple axes, the observing direction of the camera is made variable. However, the camera always merely keeps the end effector in the field of view, and does not cover yaw-axis rotation of the end effector. Therefore, the feature of object is sometimes out of the field of view of the camera. In addition, there may arises an occlusion problem in that one of links of the manipulator or a joint located between the links interposes between the object and the camera and thus the object cannot be seen from the camera.

In view of the above-mentioned problems, it is an object of the present invention to provide a manipulator with at least one camera capable of observing an end effector from a direction suitable for work of the manipulator.

SUMMARY OF THE INVENTION

In order to achieve the above-mentioned object, according to the present invention, there is provided a manipulator with at least one camera, including:

an articulated manipulator;
a rotating portion which is arranged to one of a link located at a tip end of the articulated manipulator or a second link from the tip end thereof and which is rotatable coaxially with the link located at the tip end of the manipulator,
an end effector which is coupled to the link located at the tip end of the articulated manipulator and which is able to open/close in a specific plane where the end effector can move;
at least one camera supported by the rotating portion, for recognizing an object; and an actuator for rotating the rotating portion,
in which the actuator causes the rotating portion to rotate such that the camera is arranged in a direction perpendicular to the plane where the end effector can move when the end effector performs a grip work of gripping the object, and the actuator causes the rotating portion to rotate such that the camera is arranged in a direction parallel to the plane where the end effector can move when the end effector performs one of an assembly work and an arrangement work.

According to the present invention, the camera, which is arranged on the rotating portion rotated coaxially with the end effector, can observe the end effector from a direction suitable for work of the manipulator through controlling a rotation angle of the rotating portion depending on the work.

For example, in the grip work in which the end effector grips the object, a region necessary to recognize a position of the object is often the same plane as a plane where the end effector can move. In the case that the end effecter is a gripper, the plane where the end effector can move means the plane through which the end effector passes when the end effector opens/closes. In this case, the camera is arranged in the direction perpendicular to the plane where the end effector can move.

Further, after the end effector grips the object, the object is gripped by the end effector to be restrained in a movable direction of the end effector. Therefore, in the assembly work or the arrangement work, the region necessary to recognize the position of the object is a plane perpendicular to the plane where the end effector can move, and the camera is arranged in the direction parallel to the plane where the end effector can move.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In Examples described below, a rotating portion is provided to a link located at a tip end of a manipulator or to a second link from the tip end thereof, and is structured to be movable coaxially with the link located at the tip end. This is because, in a case where a camera fixed to the rotating portion is rotated to be able to observe an end effector from a direction suitable for work, the camera looks down the end effector at a constant angle and at a constant imaging distance while always keeping the end effector in the field of view. However, the present invention is not limited to the above-mentioned structure as long as a suitable structure is adopted to perform imaging of the end effector.

An actuator for rotating the rotating portion causes the rotating portion to rotate in accordance with the work performed by the end effector, and causes the rotating portion to rotate such that the camera is arranged at a position at which the end effector is seen as a subject. As a result, an end effector can be observed from the direction suitable for work.

EXAMPLE 1

Figure 1A:
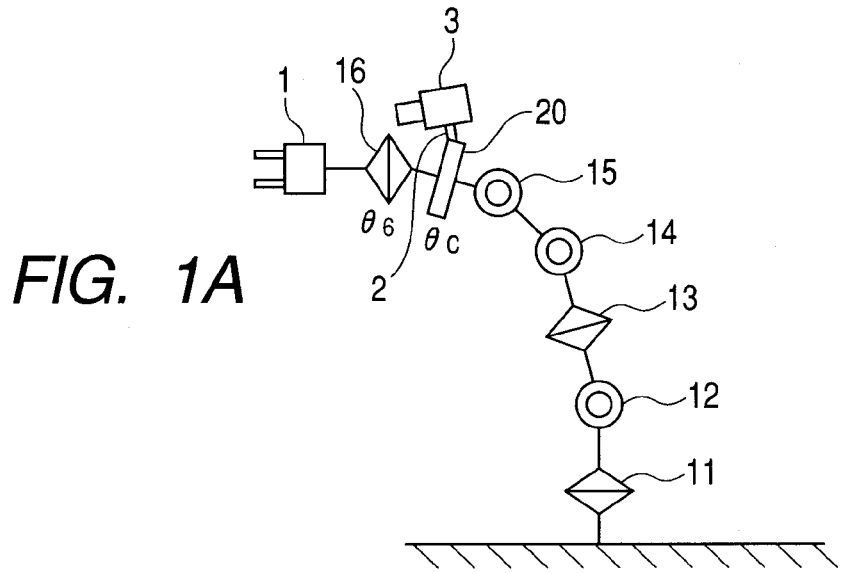
FIGS. 1A, 1B, and 1C are views illustrating a manipulator with at least one camera according to Example 1.
Figure 1B:
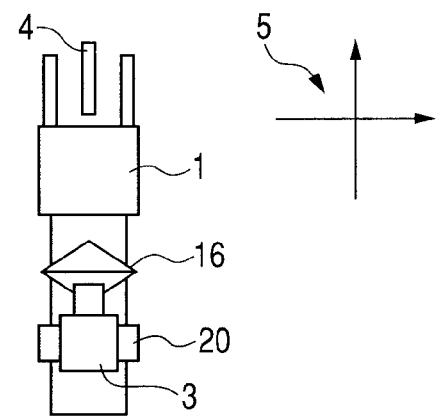
Figure 1C:
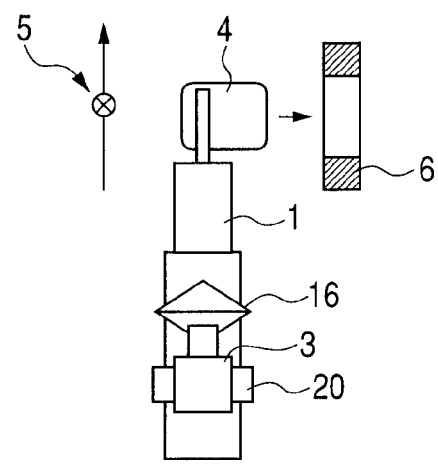

FIGS. 1A to 1C illustrate a manipulator including a 6-axis articulated manipulator with a camera according to Example 1. As illustrated in FIG. 1A, the gripper type end effector 1 is attached to a link located at a tip end of the manipulator, and a rotating portion 20 is arranged on a second link from the tip end thereof. The rotating portion is arranged to be rotatable with respect to the link located at the tip end.

A camera platform 2 is attached to the rotating portion 20, and a camera 3 is attached to the camera platform 2. An actuator for rotating the rotating portion 20 is included in the rotating portion 20.

The camera 3 is used to recognize an object (work piece) 4. Six joints 11 to 16 are rotary joints or pivot joints which couple multiple links of the articulated manipulator together. A rotation angle $\theta 6$ of the joint 16 located at the tip end of the manipulator and a rotation angle $\theta c$ of the rotating portion 20 supporting the camera 3 are coaxial with each other. Note that, in the following drawings, the same members are denoted by the same reference symbols.

FIG. 1B illustrates how the gripper type end effector 1 operates when gripping the work piece 4 placed on a workbench. When the end effector 1 grips the work piece 4 as an object, it is necessary to recognize whether the work piece 4 is surely gripped or not. Therefore, a region to be recognized is a plane parallel to a plane 5 where the end effector can move, i.e., a plane on which the end effector 1 is movable (opens/closes). This is because the work piece 4 is placed on the workbench, with the result that a direction in which the work piece is displaced when being gripped is parallel to the plane 5 where the end effector can move. Accordingly, the camera 3 is arranged in a direction perpendicular to the plane 5 where the end effector 1 can move so as to observe the plane 5 where the end effector can move from its arrangement position, with the result that the end effector 1 is observed from the direction suitable for work.

Note that, the plane where the end effector can move described herein refers to a plane defined by a center gripping direction of the end effector and an operating direction of the end effector. Further, the direction perpendicular to the plane where the end effector can move refers to a direction of a perpendicular line with respect to the plane where the end effector can move, and the direction parallel to the plane where the end effector can move refers to a direction in the plane where the end effector can move. This reference is applied similarly to Examples described below.

Therefore, in a grip work, the rotating portion 20 provided with the camera 3 is rotated by the actuator such that a position at which the camera 3 is arranged is perpendicular to the plane 5 where the end effector 1 can move.

For example, the actuator is controlled such that a difference ($|\theta 6 - \theta c|$) between the rotation angle $\theta 6$ of the joint 16 located at the tip end attached with the end effector 1 and the rotation angle $\theta c$ of the rotating portion 20 provided with the camera 3 is set within a range of from 85° to 95°. Note that, in a state in which the camera is arranged in the direction parallel to the plane 5 where the end effector can move, relation of $\theta 6 = \theta c$ is established. This is applied similarly to Examples described below.

FIG. 1C illustrates how the end effector 1 performs an insertion work (assembly work). As illustrated in FIG. 1C, when the work piece 4 gripped by the end effector 1 is inserted into a member 6 through a hole formed therein, it is necessary to recognize a gripped state of the work piece 4 for correction at the start of the insertion work or during the insertion work. The gripped work piece 4 is restrained in the direction in the plane where the end effector 1 can move, and hence a region necessary to recognize the state of the work piece 4 is a plane perpendicular to the plane 5 where the end effector 1 can move. Accordingly, the camera 3 is arranged in the direction parallel to the plane 5 where the end effector 1 can move so as to observe the plane perpendicular to the plane 5 where end effector can move from its arrangement position, with the result that the end effector 1 is observed from the direction suitable for work.

Therefore, in the assembly work, the rotating portion 20 supporting the camera 3 is rotated by the actuator such that a position at which the camera 3 is arranged is parallel to the plane 5 where the end effector 1 can move. For example, the actuator is controlled such that the difference ($|\theta 6 - \theta c|$) between the rotation angle $\theta 6$ of the joint 16 located at the tip end attached with the end effector 1 and the rotation angle $\theta c$ of the rotating portion 20 is set within 5°.

As described above, the camera 3 can be rotated by the rotating portion 20 coaxially with the link coupled with the end effector 1, and the rotation angle $\theta c$ is controlled according to the rotation angle $\theta 6$ of the joint 16. Consequently, the end effector 1 can be observed from the direction suitable for work.

EXAMPLE 2

Figure 2A:
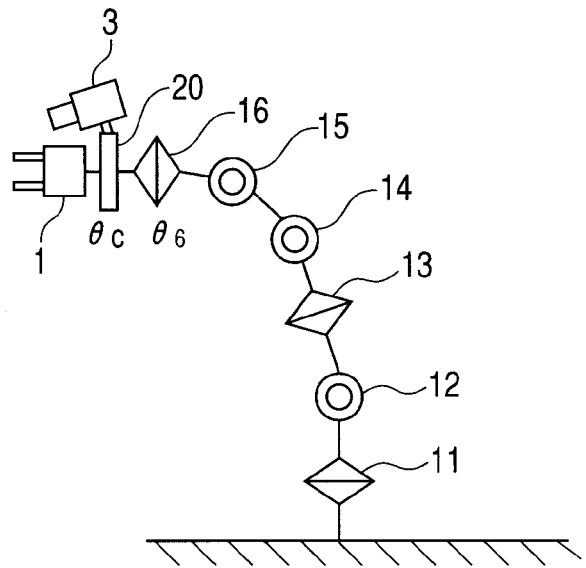
FIGS. 2A, 2B, and 2C are views illustrating a manipulator with at least one camera according to Example 2.
Figure 2B:
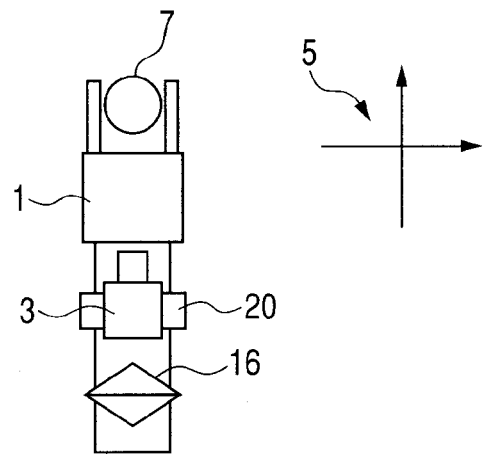
Figure 2C:
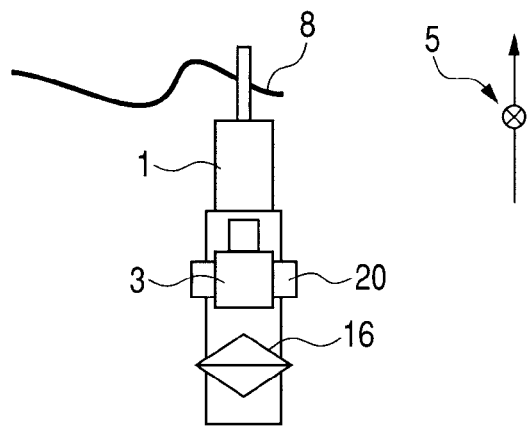

FIGS. 2A to 2C illustrate a manipulator according to Example 2. In FIG. 1A, the rotating portion and the camera are attached to the second link from the link located at the tip end. In contrast, in this example, as illustrated in FIG. 2A, the end effector 1, the rotating portion 20, and the camera 3 are attached to the first link from the tip end. Other points are the same as those of Example 1, and hence description thereof is omitted.

FIG. 2B illustrates how the end effector 1 performs a grip work of gripping an object which is a rigid body such as a metal cylinder. When the end effector 1 grips a work piece 7 as the rigid body, a region necessary to be recognized is a plane parallel to the plane 5 where the end effector 1 can move.

Accordingly, the camera 3 is arranged in a direction perpendicular to the plane 5 where the end effector 1 can move so as to observe the plane 5 where the end effector can move from its arrangement position, with the result that the end effector 1 is observed from the direction suitable for work.

Therefore, the rotating portion 20 provided with the camera 3 is rotated by the actuator such that a position at which the camera 3 is arranged is perpendicular to the plane 5 where the end effector 1 can move.

For example, the actuator is controlled such that a difference ($|\theta 6 - \theta c|$) between the rotation angle $\theta 6$ of the joint 16 located at the tip end attached with the end effector 1 and the rotation angle $\theta c$ of the rotating portion 20 is set within a range of from 85° to 95°.

Further, FIG. 2C illustrates how the end effector performs a grip work of gripping an object which is a flexible body. Here, a cable is exemplified as the flexible body. In a case where the object is the flexible body such as a cable, it is necessary to first grip the object roughly while opening a gripper and then to recognize a position of the flexible body by the camera, to thereby grip the object precisely. In this case, the flexible body obeys in the direction parallel to the plane where the end effector can move on which the end effector opens/closes. Thus, for precise gripping, it is necessary to correct how to grip the object in a plane direction perpendicular to the plane where the end effector can move through recognizing the same by the camera. Accordingly, the camera 3 is arranged in the direction parallel to the plane 5 where the end effector 1 can move so as to observe the plane 5 where the end effector can move from its arrangement position, with the result that the end effector 1 is observed from the direction suitable for work.

Therefore, the rotating portion 20 provided with the camera 3 is rotated by the actuator such that a position at which the camera 3 is arranged is parallel to the plane 5 where the end effector 1 can move.

For example, the actuator is controlled such that the difference ($|\theta 6-\theta c|$) between the rotation angle $\theta 6$ of the joint 16 located at the tip end attached with the end effector 1 and the rotation angle $\theta c$ of the rotating portion 20 is set within 5°.

Note that, in this case, whether the object is the rigid body or the flexible body is set in advance at the time of instruction of the manipulator.

As described above, the camera 3 can be rotated by the rotating portion 20 coaxially with the link coupled with the end effector 1, and the rotation angle $\theta c$ is controlled according to the rotation angle $\theta 6$ of the joint 16. Consequently, the end effector 1 can be observed from the direction suitable for work.

EXAMPLE 3

Figure 3A:
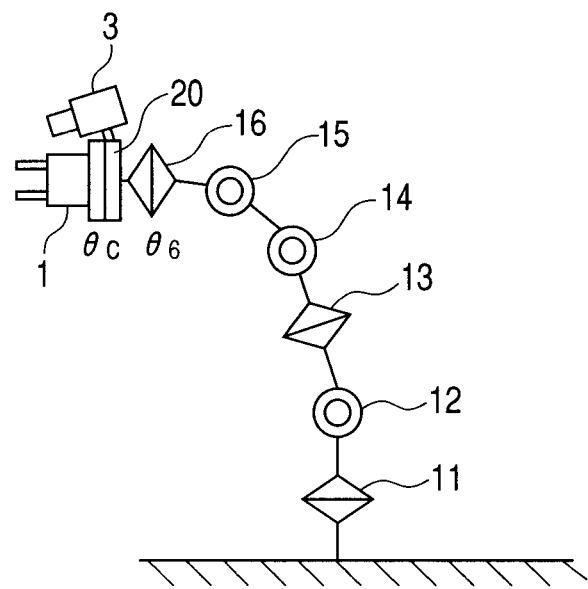
FIGS. 3A, 3B, and 3C are views illustrating a manipulator with at least one camera according to Example 3.
Figure 3B:
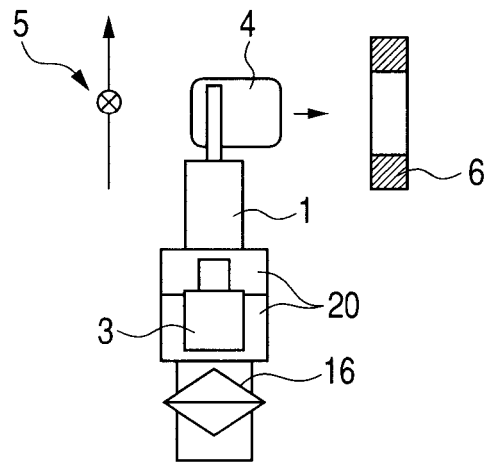
Figure 3C:
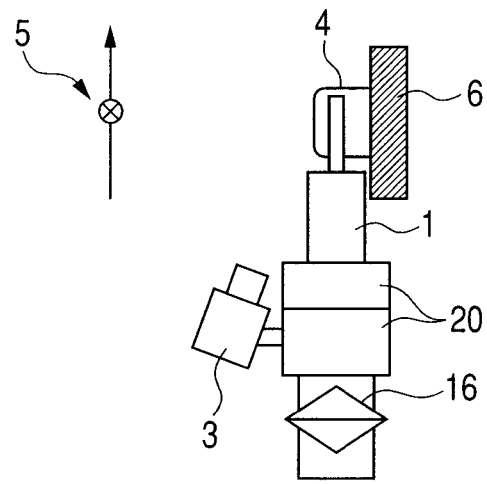

FIGS. 3A to 3C illustrate a manipulator according to Example 3. In FIG. 2A in Example 2, the rotating portion, the camera, and the end effector are attached to the first link from the tip end. In contrast, in this example, as illustrated in FIG. 3A, the rotating portion 20 and the camera 3 are attached to the first link from the tip end, and the end effector 1 is attached to the rotating portion 20. Other points are the same as those of Example 2, and hence description thereof is omitted.

FIG. 3B illustrates how the end effector 1 performs an insertion work. Here, similarly to Example 1, the camera 3 is arranged in a direction parallel to the plane 5 where the end effector 1 can move so as to observe the plane 5 where the end effector can move from its arrangement position, with the result that the end effector 1 is observed from the direction suitable for work.

Therefore, the rotating portion 20 provided with the camera 3 is rotated by the actuator such that a position at which the camera 3 is arranged is parallel to the plane 5 where the end effector 1 can move. For example, the actuator is controlled such that a difference ($|\theta 6-\theta c|$) between the rotation angle $\theta 6$ of the joint 16 located at the tip end attached with the end effector 1 and the rotation angle $\theta c$ of the rotating portion 20 is set within 5°.

Further, FIG. 3C illustrates how to perform, after the insertion work, an inspection work of inspecting a state in which the work piece 4 is inserted into an insertion object 6. During the inspection work of inspecting a position and a posture at which the object is assembled or arranged, it is hard to recognize an insertion hole even if the camera observes the insertion hole from the direction parallel to the plane 5 where the end effector 1 can move, and hence it is difficult to perform the inspection. Accordingly, the camera 3 is arranged in the direction perpendicular to the plane 5 where the end effector 1 can move so as to inspect the insertion hole, with the result that the end effector 1 is observed from the direction suitable for work.

Therefore, the rotating portion 20 provided with the camera 3 is rotated by the actuator such that a position at which the camera 3 is arranged is parallel to the plane 5 where the end effector 1 can move. For example, the actuator is controlled such that the difference ($|\theta 6-\theta c|$) between the rotation angle $\theta 6$ of the joint 16 located at the tip end attached with the end effector 1 and the rotation angle $\theta c$ of the rotating portion 20 is set within a range of from 85° to 95°.

As described above, the camera 3 can be rotated by the rotating portion 20 coaxially with the link coupled with the end effector 1, and the rotation angle $\theta c$ is controlled in accordance with the rotation angle $\theta 6$ of the joint 16. Consequently, the end effector 1 can be observed from the direction suitable for work.

EXAMPLE 4

Figure 4A:
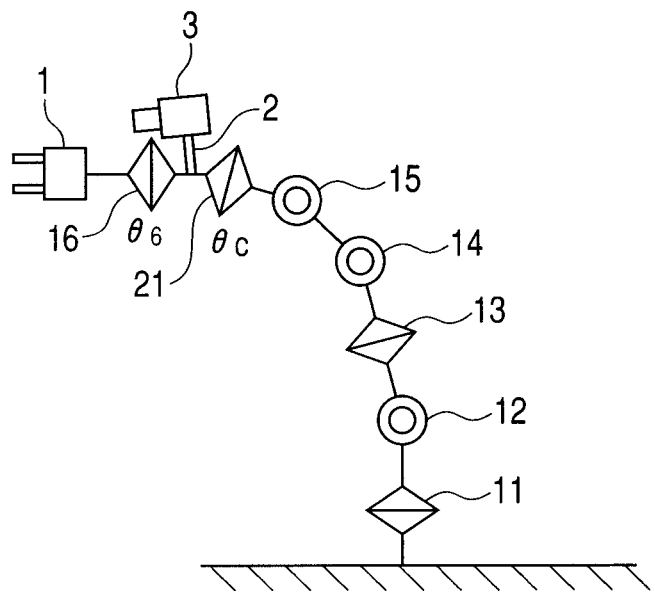
FIGS. 4A, 4B, and 4C are views illustrating a manipulator with at least one camera according to Example 4.
Figure 4B:
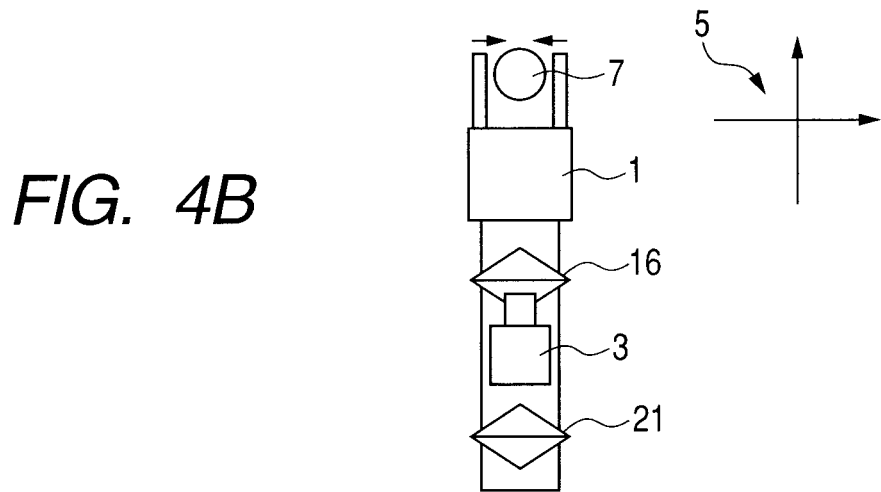
Figure 4C:
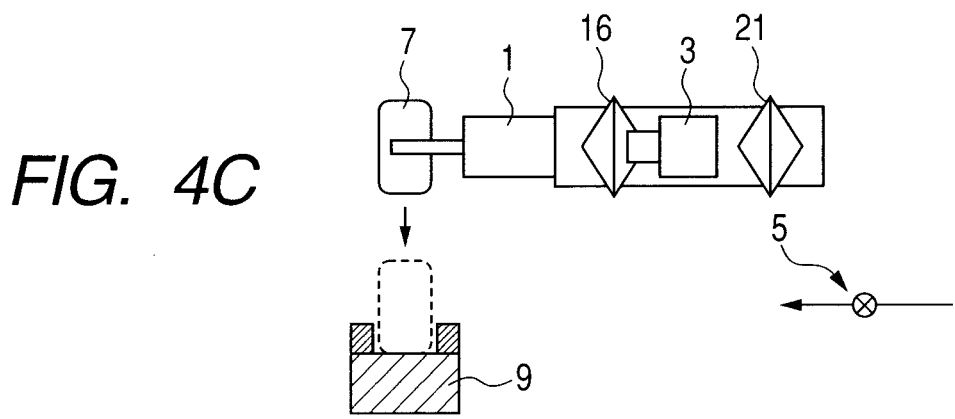

FIGS. 4A to 4C illustrate a manipulator according to Example 4. In this example, as illustrated in FIG. 4A, instead of the rotating portion 20 in Example 1, there is used a rotating portion 21 including a rotary joint which is assembled between the first joint 16 and the second joint 15 from the tip end in series with the joints. Therefore, the manipulator includes a 7-axis articulated manipulator. The camera platform 2 is attached to the rotating portion 21 coupled in series with the first joint 16 from the tip end, and the camera 3 is mounted on the camera platform 2. Other points are the same as those of Example 1, and hence description thereof is omitted.

FIG. 4B illustrates how the end effector performs a grip work. Further, FIG. 4C illustrates how the end effector 1 performs an arrangement work.

Meanwhile, in order to perform the work smoothly without causing collision between another article and the camera during the work, it is necessary to rotate the rotating portion supporting the camera such that a difference between a desired position of the camera 3 and a position relative to another article 10 is minimized.

The following matter regarding avoidance of the collision between another article and the camera may be applied to any one of Examples 1 to 3 described above.

Figure 5A:
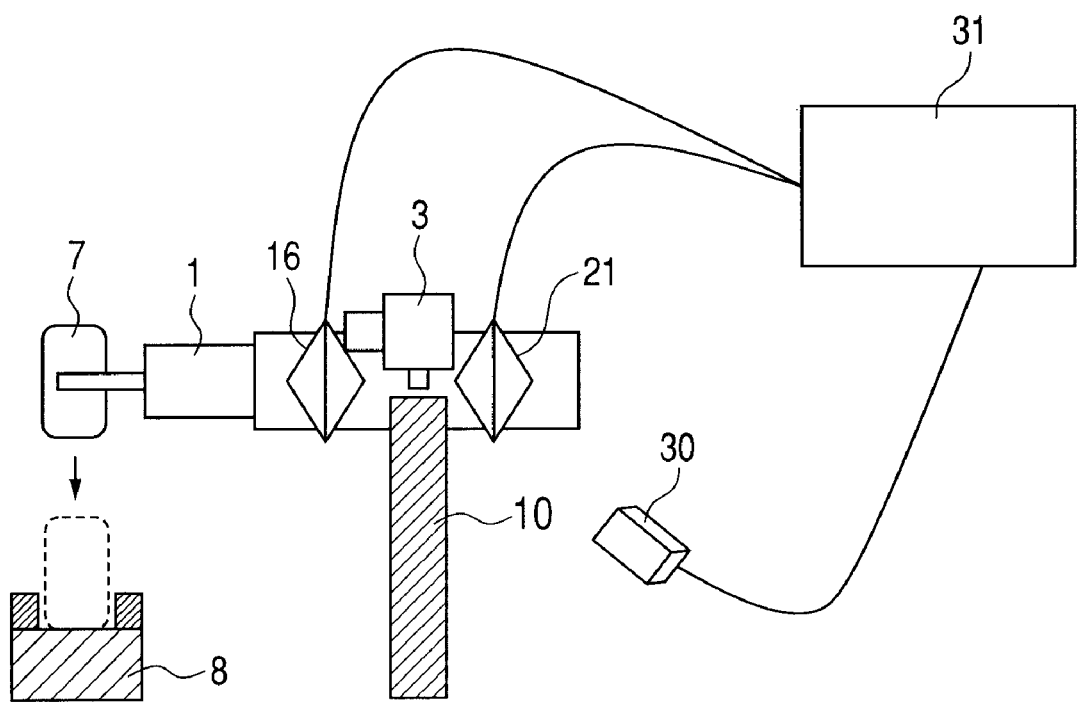
FIGS. 5A and 5B are views illustrating an operation performed to avoid collision between another article and a camera according to Example 4.
Figure 5B:
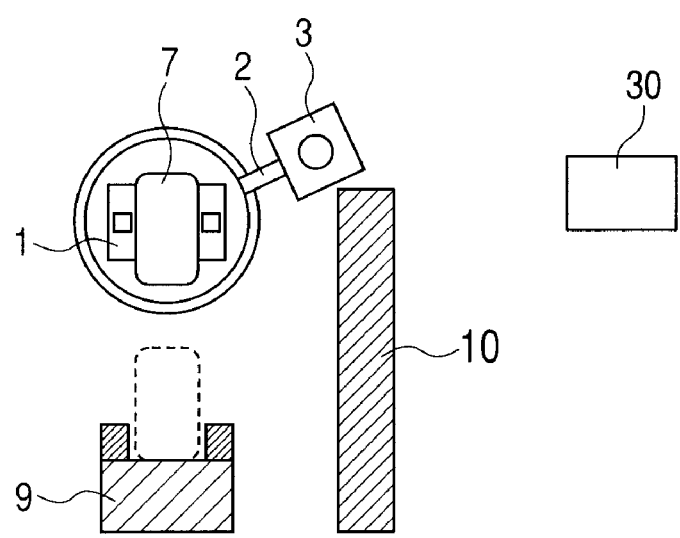

FIG. 5A illustrates a state in which an actuator for the rotating portion 21 is controlled in consideration of avoidance of the collision between another article 10 and the camera 3. There is provided a sensor 30 for detecting a risk of the collision between the camera 3 and another article 10 likely to cause the collision with the camera 3. The sensor 30 emits rays around another article 10, and monitors whether or not the rays are blocked. In this manner, the sensor 30 detects that the camera 3 comes close to another article 10 and thus the collision risk arises. Detection results obtained by the sensor 30 are sent to a control device 31 for controlling the respective actuators for the joint 16 and the rotating portion 21. Further, the rotating portion 21 is controlled such that the relative relation between the rotation angles $\theta 6$ and $\theta c$ becomes closer to a desired value within a range where no collision occurs. FIG. 5B illustrates a state in which the collision between the camera 3 and another article 10 in FIG. 5A is avoided.

Note that, in this example, a unit for detecting the collision risk during the work with use of the sensor is described.

However, through performing beforehand inspection, instruction may be made to avoid the collision. As such a method, there is used a method of virtually constructing on a computer the same environment as the environment in which actual obstacles are assumed, and of operating, in the virtual environment configured on the computer, a model having the same structure as that of an actual manipulator with at least one camera. In the operating process on the virtual environment, whether the collision between another article and the camera occurs or not is inspected. With this method, also in consideration of avoidance of the collision, the rotation angle of the rotating portion for controlling the position of the camera can be set in the direction suitable for work.

Figure 6:
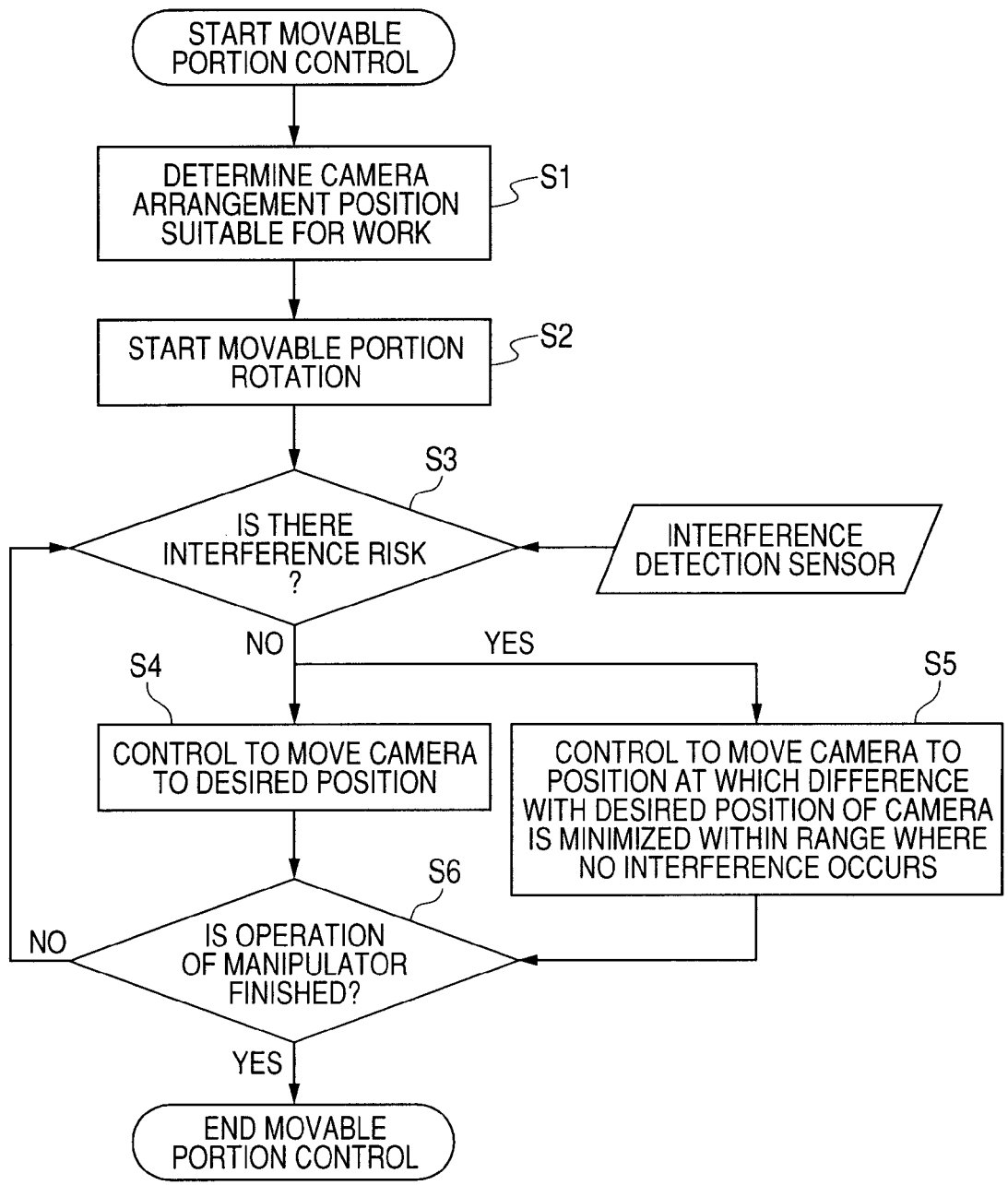
FIG. 6 is a flowchart illustrating the operation of a device illustrated in FIGS. 5A and 5B.
Figure 7A:
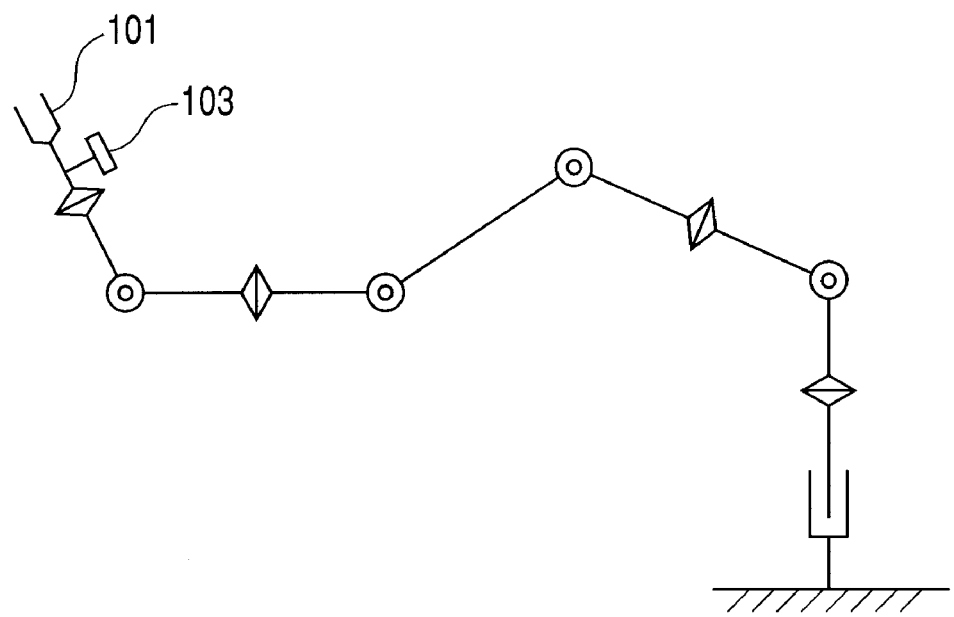
FIGS. 7A and 7B are views illustrating a conventional manipulator with at least one camera.
Figure 7B:
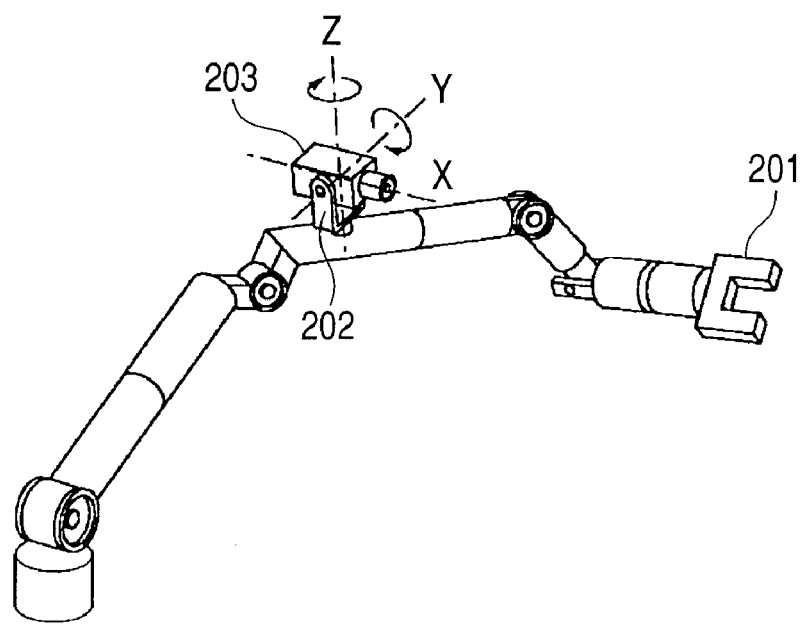

FIG. 6 is a flowchart illustrating determining an operation in a case of considering avoidance of the collision. When control of the rotating portion 21 is started, a desired position of the camera is determined depending on an intended work (Step S1). Then, in order to move the camera 3 to the desired position, control of the actuator for the rotating portion 21 is started by the control device 31 (Step S2). During the control of the actuator, the control device 31 performs real-time monitoring on the sensor 30 for detecting the collision between another article 10 and the camera 3 (Step S3). In a case where the sensor 30 does not detect the risk of the collision between another article 10 and the camera 3, the actuator for the rotating portion 21 is controlled such that the difference ($|\theta 6-\theta c|$) between the rotation angle $\theta 6$ of the joint 16 and the rotation angle $\theta c$ of the rotating portion 21 is set to a desired angle (Step S4). In a case where the sensor 30 detects the risk of the collision between another article 10 and the camera 3, the actuator for the rotating portion 21 is controlled such that a difference between the difference ($|\theta 6-\theta c|$) in rotation angles and a desired difference therein is minimized within a range where no collision between another article 10 and the camera 3 occurs (Step S5). Those steps are performed repeatedly during the operation of the manipulator. When the operation of the manipulator is finished (Step S6), the control of the actuator for the rotating portion 21 is finished.

As described above, the camera 3 can be rotated by the rotating portion 21 coaxially with the link coupled with the end effector 1, and the rotation angle $\theta c$ is controlled according to the rotation angle $\theta 6$ of the joint 16. Consequently, the end effector 1 can be observed from the direction suitable for work.

In this example, the rotating portion 21 is assembled in series with the joints 11 to 16 of the manipulator, and hence only the camera 3 and the camera platform 2 are attached on an outer side of the manipulator. Thus, a reduction in size can be achieved in comparison with the other examples. Owing to the reduction in size in this manner, it is possible to shorten a length of the camera 3 protruding from the rotating portion 21, and to reduce a rotation region of the camera even when the camera 3 is rotated depending on the work. Thus, it is possible to reduce a region where the collision with another article may occur, and hence the collision with another article is easily avoided.

In a case where the collision between another article 10 and the camera 3 occurs, the rotation angle of the rotating portion 21 is controlled such that the difference with the desired position of the camera is minimized in consideration of avoidance of the collision. In this way, it is possible to observe the end effector 1 from the direction suitable for work under a condition of avoiding the collision between another article 10 and the camera 3. When the above-mentioned structure is applied to the manipulator according to each of Examples 1 to 3 described above, it is possible to avoid a collision problem that is likely to arise along with drive of the camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-121188, filed May 19, 2009, and Japanese Patent Application No. 2010-108546, filed May 10, 2010 which are hereby incorporated by reference herein in their entirety.

What is claimed is:

1. A manipulator with at least one camera, comprising:
   an articulated manipulator coupled with multiple links together;
   a rotating portion provided coaxially with the articulated manipulator;
   an end effector which is coupled to a link located at a tip end of the articulated manipulator and which is able to open/close in a specific plane where the end effector can move;
   a camera supported by the rotating portion, for recognizing an object; and
   an actuator for rotating the rotating portion,
   wherein the actuator causes the rotating portion to rotate in accordance with work performed by the end effector, and causes the rotating portion to rotate such that the camera is arranged at a position at which the end effector is seen as a subject.

2. The manipulator with at least one camera according to claim 1, further comprising a sensor for detecting, based on whether or not a ray that the sensor emits is blocked, existence of another article on the ray,
   wherein the actuator causes the rotating portion to rotate such that collision between another article and the camera is avoided.

3. A manipulator with at least one camera, comprising:
   an articulated manipulator coupled with multiple links together;
   a rotating portion which is arranged to one of a link located at a tip end of the articulated manipulator and a second link from the tip end thereof and which is rotatable coaxially with the link located at the tip end of the articulated manipulator; an end effector which is coupled to the link located at the tip end of the articulated manipulator and which is able to open/close in a specific plane where the end effector can move;
   a camera supported by the rotating portion, for recognizing an object; and
   an actuator for rotating the rotating portion,
   wherein the actuator causes the rotating portion to rotate such that the camera is arranged in a direction perpendicular to the plane where the end effector can move when the end effector performs a grip work of gripping the object, and the actuator causes the rotating portion to rotate such that the camera is arranged in a direction parallel to the plane where the end effector can move when the end effector performs one of an assembly work and an arrangement work.

4. A manipulator with at least one camera, comprising:
   an articulated manipulator coupled with multiple links together;
   a rotating portion which is arranged to a tip end of the articulated manipulator so as to be rotatable;

an end effector which is coupled to a link located at the tip end of the articulated manipulator and which is able to open/close in a specific plane where the end effector can move;

a camera supported by the rotating portion, for recognizing an object; and an actuator for rotating the rotating portion, wherein, when the end effector performs a grip work of gripping the object, the actuator causes the rotating portion to rotate such that the camera is arranged in a direction perpendicular to the plane where the end effector can move in a case where the object comprises a rigid body, and the actuator causes the rotating portion to rotate such that the camera is arranged in a direction parallel to the plane where the end effector can move in a case where the object comprises a flexible body.

5. A manipulator with at least one camera, comprising:

an articulated manipulator coupled with multiple links together;

a rotating portion which is arranged to one of a link located at a tip end of the articulated manipulator and a second link from the tip end thereof and which is rotatable coaxially with the link located at the tip end of the articulated manipulator;

an end effector which is coupled to the link located at the tip end of the articulated manipulator and which is able to open/close in a specific plane where the end effector can move;

a camera supported by the rotating portion, for recognizing an object; and an actuator for rotating the rotating portion, wherein the actuator causes the rotating portion to rotate such that the camera is arranged in a direction parallel to the plane where the end effector can move when the end effector performs one of an assembly work and an arrangement work, and the actuator causes the rotating portion to rotate such that the camera is arranged in a direction perpendicular to the plane where the end effector can move when the end effector performs an inspection work of inspecting one of an assembled state and an arranged state of the object.

* * * * *